(12) United States Patent
Hsu et al.

(10) Patent No.: US 7,413,318 B2
(45) Date of Patent: Aug. 19, 2008

(54) DIRECT TYPE BACKLIGHT MODULE

(75) Inventors: Tung-Ming Hsu, Tu-cheng (TW);
Wen-Feng Cheng, Tu-cheng (TW);
Chien-Min Chen, Tu-cheng (TW);
Ming-Fu Hsu, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 6 days.

(21) Appl. No.: 11/407,841

(22) Filed: Apr. 20, 2006

(65) Prior Publication Data

US 2007/0103889 A1 May 10, 2007

(30) Foreign Application Priority Data

Nov. 4, 2005 (TW) .............................. 94138782 A

(51) Int. Cl.
*G09F 13/04* (2006.01)
(52) U.S. Cl. .......................... 362/97; 362/634; 362/611; 349/64
(58) Field of Classification Search ................. 362/611, 362/614, 609, 634, 615, 616, 260, 559, 560, 362/97; 349/58, 64, 67, 70
See application file for complete search history.

(56) References Cited

U.S. PATENT DOCUMENTS

| 5,555,161 | A  | * | 9/1996  | Roe et al. ................... 362/555 |
| 5,613,750 | A  | * | 3/1997  | Roe ............................. 362/26 |
| 6,561,663 | B2 | * | 5/2003  | Adachi et al. ............... 362/616 |
| 6,880,947 | B2 | * | 4/2005  | Hsieh et al. ................. 362/614 |
| 6,974,221 | B2 | * | 12/2005 | Wu et al. ....................... 362/29 |
| 7,101,074 | B2 | * | 9/2006  | Kuo et al. .................... 362/634 |
| 2004/0228106 | A1 | * | 11/2004 | Stevenson et al. ............. 362/31 |
| 2004/0239829 | A1 | * | 12/2004 | Yu et al. ........................ 349/61 |
| 2004/0257792 | A1 | * | 12/2004 | Yu et al. ........................ 362/31 |
| 2005/0180142 | A1 | * | 8/2005  | Tsai ........................... 362/294 |
| 2006/0274547 | A1 | * | 12/2006 | Kao et al. .................... 362/560 |

* cited by examiner

*Primary Examiner*—Jong-Suk (James) Lee
*Assistant Examiner*—Edmund C Kang
(74) *Attorney, Agent, or Firm*—Morris Manning Martin LLP; Tim Tingkang Xia, Esq.

(57) ABSTRACT

A direct type backlight module (200) includes a substrate (231), a diffusion sheet (24) disposed above the substrate, a plurality of spacers (21) and a plurality of light sources (22). The spacers are disposed between the substrate and the diffusion sheet. Each spacer includes a bottom surface (211) contacting with the substrate. A groove (2114) is defined in the bottom surface, and a light incident surface (2112) is defined on inner surface of the groove. A pair of wings is disposed on two sides of the bottom surface for supporting the diffusion sheet. Each wing includes an outer side surface and an inner side surface, and a transflective film is formed on the inner side surfaces of the wing. The light sources are respectively disposed in the grooves.

16 Claims, 4 Drawing Sheets

DIRECT TYPE BACKLIGHT MODULE

BACKGROUND OF THE INVENTION

1. Field of the Invention

The present invention generally relates to a backlight module and, more particularly, to a direct type backlight module.

2. Discussion of the Related Art

Most liquid crystal display (LCD) devices are passive devices in which images are displayed by controlling an amount of light input from an outside light source. Thus, a separate light source (for example, backlight module) is generally employed for irradiating an LCD.

Generally, backlight modules can be classified into an edge type or a direct type based upon arrangement of lamps within the device. The edge type backlight module has a lamp unit arranged at a side portion of a light guiding plate for guiding light. The edge type backlight modules are commonly employed in small-sized LCDs due to their lightweight, miniature and low electric consumption. However, the edge type backlight modules are not suitable for large-sized LCDs (20 inches or more). A direct type backlight module has a plurality of lamps arranged in regular positions to directly illuminate an entire surface of an LCD panel. The direct type backlight modules have higher utilization efficiency of light energy and longer operational service life than the edge type backlight modules, and are specially produced for large-sized LCD devices.

One kind of direct type backlight module is illustrated in FIG. 1. The backlight module 100 includes a plurality of spacers 11, a plurality of light sources 12, a frame 13 and a diffusion sheet 14. The frame 13 includes a plane substrate (not labeled), a number of circumferential sidewalls (not labeled) extending from the substrate to a predefined opening (not labeled), and a reflective film (not shown) that is coated in an inner surface of the frame 13. The diffusion sheet 14 is accommodated in the opening of the frame 13. The spacers 11 are disposed in the space encompassed by the diffusion sheet 14 and frame 13 for supporting the diffusion sheet 14. The light sources 12 are arranged in the substrate of the frame 13 with a selected interval.

In the current backlight module 100, the reflective film coated in the frame 13 reflects the light scattered downwardly from the light sources 12 upwardly to the diffusion sheet 14. Because the brightness is in an inverse ratio to the distance, the diffusion sheet 14 right above the light sources 12 will have more light beams and more brightness, while the other portions of the diffusion sheet 14 above the left and right sides of the light sources 12 will have less light beams and less brightness. Thereby lowering the light uniform of the direct backlight 100, causing irregular shade brightness on the LCD. Furthermore, the backlight module 100 employs a plurality of light sources 12 to reach a high luminance, these light sources 12 produce a great deal of heat accumulated inside the backlight module 100. Therefore, heat dissipation of the backlight module 100 is usually a hard nut to crack.

Therefore, a new direct type backlight module is desired in order to overcome the above-described shortcomings.

SUMMARY OF THE INVENTION

A direct type backlight module includes a substrate, a diffusion sheet disposed above the substrate, a plurality of spacers, and a plurality of light sources. The spacers are disposed between the substrate and the diffusion sheet. Each spacer includes a bottom surface contacting with the substrate. A groove is defined in the bottom surface, and a light incident surface is defined on an inner surface of the groove. A pair of wings is disposed on two sides of the bottom surface for supporting the diffusion sheet. Each wing includes an outer side surface and an inner side surface, a transflective film is also formed on the inner side surfaces of the wing. The light sources are respectively disposed in the grooves.

Other novel features will become more apparent from the following detailed description when taken in conjunction with the accompanying drawings.

BRIEF DESCRIPTION OF THE DRAWINGS

Many aspects of the direct type backlight module can be better understood with reference to the following drawings. The components in the drawings are not necessarily drawn to scale, the emphasis instead being placed upon clearly illustrating the principles of the present direct type backlight module. Moreover, in the drawings, like reference numerals designate corresponding parts throughout the several views.

DETAILED DESCRIPTION OF THE EMBODIMENTS

Figure 1:
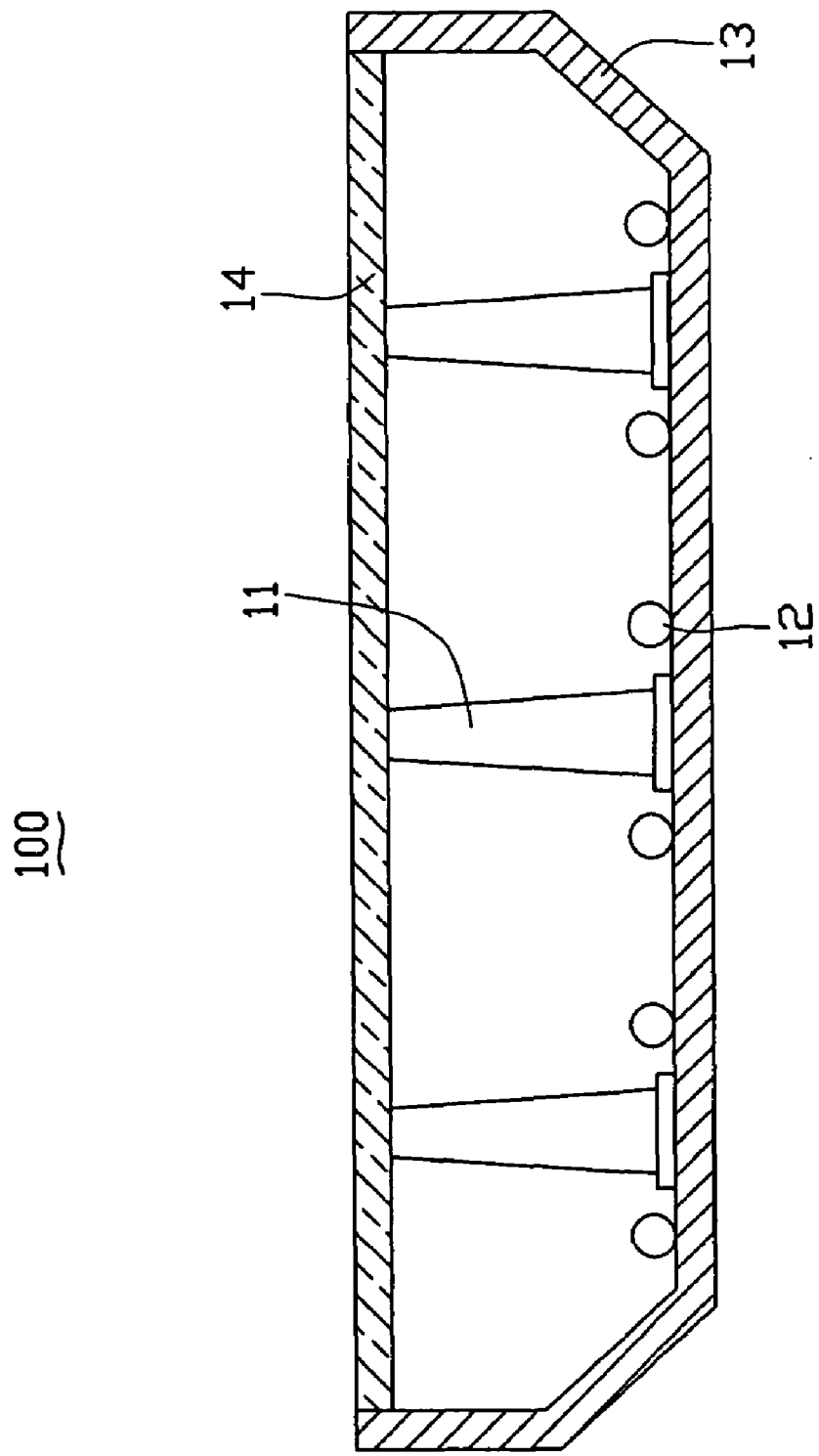
FIG. 1 is a schematic, cross-sectional view of a conventional direct type backlight module.
Figure 2:
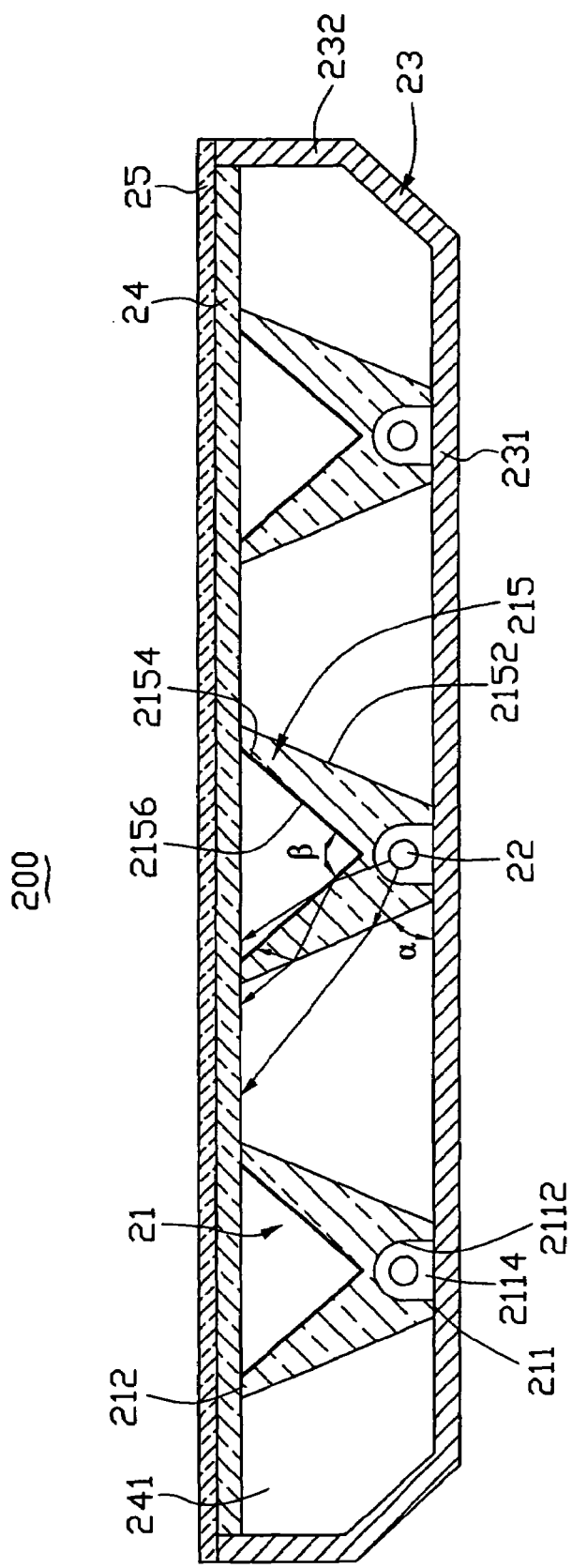
FIG. 2 is a schematic, cross-sectional view of a direct type backlight module including a plurality of spacers, in accordance with a first embodiment of the present invention.

Referring to FIG. 2, a direct type backlight module 200 according to a first embodiment of the present invention includes a plurality of spacers 21, a plurality of light sources 22, a frame 23, and a diffusion sheet 24 used as a light treatment means. In the illustrated embodiment, the number of spacers 21 is three. The quantity of light sources 22 corresponds to the spacers 21, and the number of light sources 22 is also three.

The frame 23 is substantially a hollow cuboid. The frame 23 includes a plane substrate 231 and a number of circumferential sidewalls 232 extending from the substrate 231 defining an opening (not labeled). A reflective sheet or a reflective film (not shown) is disposed on an inner surface of the substrate 231. A reflective sheet or a reflective film (not shown) is also disposed on an inner surface of the sidewalls 232.

The diffusion sheet 24 is substantially a rectangular sheet. The diffusion sheet 24 is configured for diffusing light beams produced by the light sources 22 and for passing uniform light beams. The diffusion sheet 24 is accommodated in the opening of the frame 23, and a chamber 241 is defined between the substrate 231 and the diffusing sheet 24 with the sidewalls 232.

Figure 3:
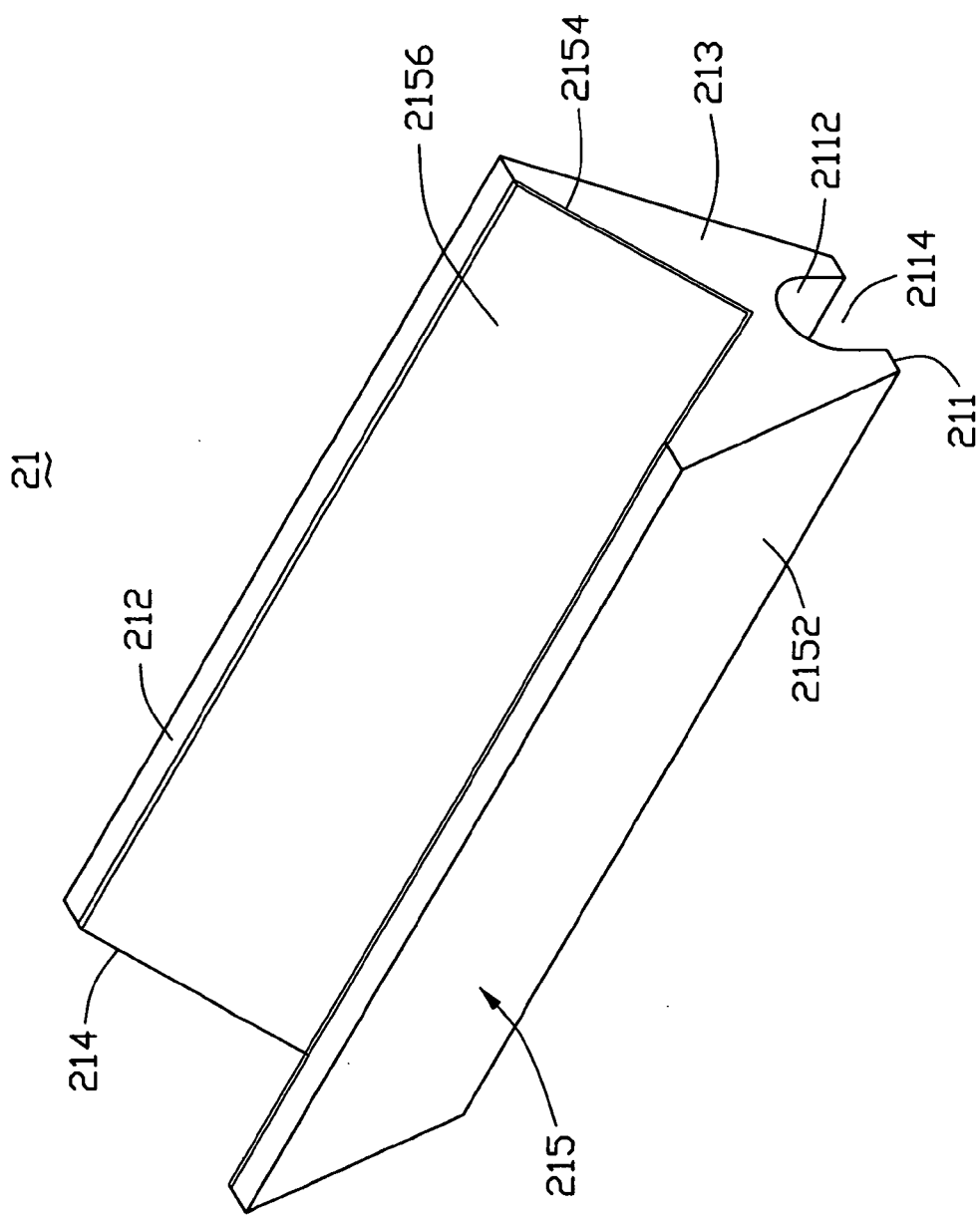
FIG. 3 is an enlarged, schematic view of the spacer as shown in FIG. 2.

Referring also to FIG. 3, the spacers 21 are disposed in the chamber 241 encompassed by the diffusion sheet 24 and the substrate 231 of the frame 23. Each spacer 21 includes a bottom surface 211 and a top surface 212. The bottom surface 211 is placed in contact with the substrate 231 of the frame 23. The top surface 212 is placed in contact with the diffusion sheet 24. A groove 2114 is defined in the bottom surface 211, and a light incident surface 2112 is defined on an inner surface of the groove 2114. Each spacer 21 includes a first end surface 213 and an opposite second end surface 214. A reflective film (not shown) is coated on the first end surface 213 and the second end surface 214, thereby preventing the light beams from dispersing through the first end surface 213 and the second end surface 214. Each spacer 21 includes a pair of symmetrical wings 215 located at two side portions of the light incident surface 2112 for supporting the diffusion sheet 24. A thickness of the wing 215 is reduced from the bottom surface 211 to the top surface 212. Each wing 215 includes an outer side surface 2152 and an inner side surface 2154. A first angle α is defined by the outer side surface 2152 of the wing 215 relative to the substrate 231 of the frame 23. The first angle α is in a range from about 0 to about 90 degrees, preferably 70 degrees. A V-shaped groove is defined by the two inner side surfaces 2154 of the two wings 215 of each spacer 21, the V-shaped groove has a vertex angle β that is in a range from about 0 to about 96 degrees, preferably 85 degrees. A transflective film 2156 is set at each inner side surface 2154 of the spacers 21. The transflective film 2156 is configured to transmit some light beams, and reflect the other. The transflective film 2156 includes a substrate (not shown) and a media optical film (not shown) coated on the substrate. A material of the substrate can be selected, for example, from a group consisting of aluminum (Al), gold (Au), and/or silver (Ag). A material of the media optical film can be selected, for example, from a group consisting of polypropylene (OPP), polyvinyl chloride (PVC), and/or a combination thereof.

A material of the spacer 21 can be selected, for example, from a group consisting of transparent polymethyl methacrylate (PMMA), polycarbonate (PC), modified PMMA, modified PC, and/or a combination thereof. The modified PMMA is manufactured by uniformly dispersing a plurality of modified particles into PMMA matrix material. In the same way, the modified PC is also manufactured by uniformly dispersing a plurality of modified particles into PC matrix material. The modified particles can be selected from a group consisting of silicon dioxide ($SiO_2$) and titanium dioxide ($TiO_2$) particles.

The light sources 22 can be cold cathode fluorescent lamps (CCFLS) or light emitting diodes (LEDs). In the illustrated embodiment, the light sources 22 are CCFLs. The light sources 22 are arranged in the grooves 2114. A number of O-shaped rings (not shown) are mounted at the light source 22 where the light source 22 is engaged with the spacer 21. Furthermore, the O-shaped rings have shock resisting attributes so they can protect the light sources 22 and the spacers 21.

When the backlight module 200 is in use, the light beams produced by the light sources 22 are emitted to the light incident surface 2112 of the spacer 21, the light beams are then delivered to the outer side surface 2152 and the inner side surface 2154 of the spacer 21. The transflective film 2156 of the inner side surface 2154 transmits some light beams to an area of the diffusion sheet 24 directly above the spacer 21 (the most bright area), and reflects the other light beams to the outer side surface 2152 and refracted to a area of the diffusion sheet 24 between two adjacent spacers 21 (the darkest area). Thus, creating a uniform light beams distribution. Moreover, the first angle α and the vertex angle β can be altered according to predetermined demands to increase the transmission of the light beams from the outer side surface 2152 to a area of the diffusion sheet 24 between two adjacent spacers 21, and to decrease the transmission of the light beams to the substrate 231 of the frame 23. Thereby the illumination of the darkest area of the diffusion sheet 24 between two adjacent spacers 21 can be increased. In other words, by setting the transflective film 2156 at the inner side surfaces 2154 of the spacer 21 and altering the first angle α and the vertex angle β, a high transmission of the light beams can be focused to the darkest area of the diffusion sheet 24 between two adjacent spacers 21, creating a uniform light beams distribution on the whole diffusion sheet 24, so as to let the illumination of the backlight module 200 radiate more evenly.

In order to improve the optical uniformity and brightness, the backlight module 200 preferably further includes an optical film 25 which is stacked on the diffusion sheet 24. The optical film 25 can be selected from one of a brightness enhancement film and a diffusion film.

Figure 4:
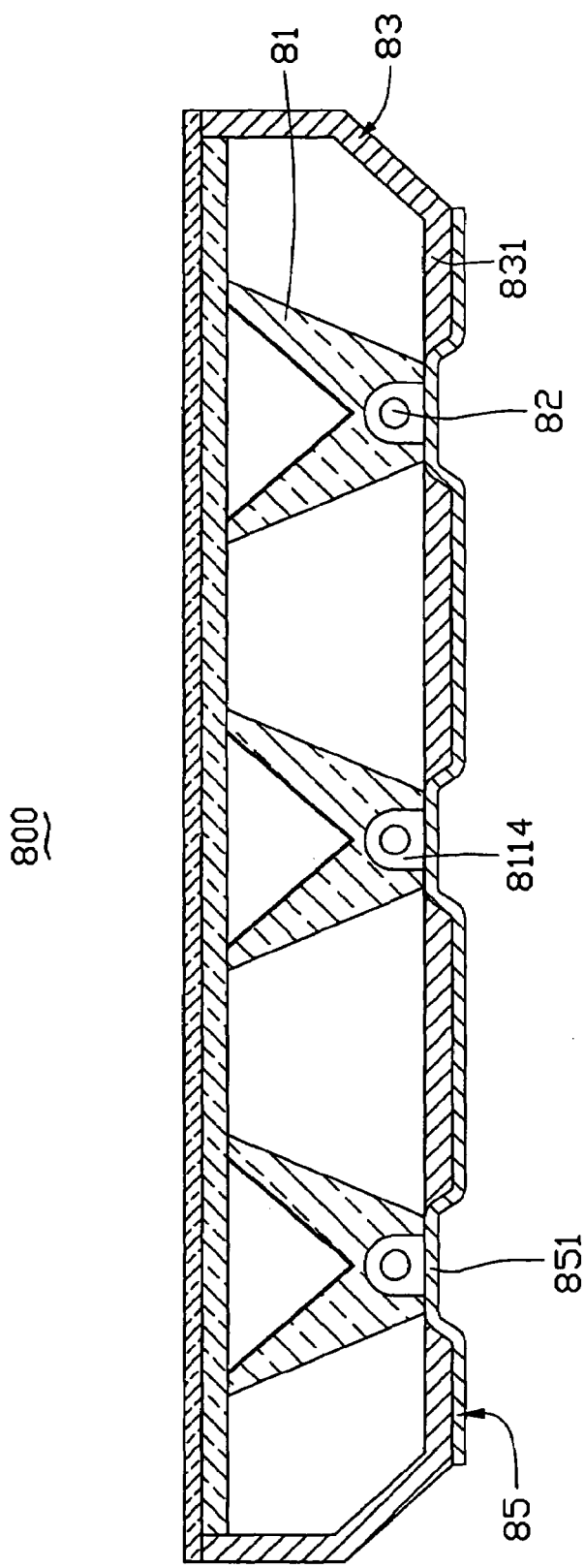
FIG. 4 is a schematic, cross-sectional view of a direct type backlight module including a plurality of spacers and a heat dissipation unit, in accordance with a second embodiment of the present invention.

Referring to FIG. 4, a backlight module 800 according to a second embodiment of the present invention, is similar in principle to the backlight module 200, except that a plurality of holes (not labeled) are defined in the substrate 831 of the frame 83, the quantity of holes corresponds to the spacers 81. In the illustrated embodiment, the number of holes is three. The backlight module 800 further includes a heat dissipation unit 85. The heat dissipation unit 85 is substantially a metal board. The heat dissipation unit 85 has a plurality of protrusions 851, and the quantity and size of protrusions 851 correspond to the holes of the frame 83. In the illustrated embodiment, the number of protrusions 851 is three. The heat dissipation unit 85 is mounted under the substrate 831 of the frame 83, with the protrusions 851 engaging with the holes of the frame 83. The spacers 81 are located in the protrusions 851 of the heat dissipation unit 85. The light sources 82 are located in the grooves 8114 of the spacers 81. When the backlight module 800 is put to use for a continuous time, the heat produced by the light sources 82 is conducted to the whole heat dissipation unit 85 via the protrusions 851, and the heat can be dispersed rapidly. Thus, the backlight module 800 will have an improved heat dissipation performance.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A direct type backlight module comprising:
   a substrate;
   a diffusion sheet disposed above the substrate;
   a plurality of spacers disposed between the substrate and the diffusion sheet, each spacer including:
      a bottom surface contacting with the substrate, a groove defined in the bottom surface;
      a light incident surface defined on an inner surface of the groove;
      a pair of wings disposed on two sides of the bottom surface for supporting the diffusion sheet, wherein each wing includes an outer side surface tapering downwardly and inwardly from the diffusion sheet to the substrate and an inner side surface facing only the diffusion sheet, the outer side surface is nearer to the substrate than the inner side surface, the inner side surface is nearer to the diffusion sheet than the outer side surface; and
      a transflective film formed on the inner side surfaces of the two wings; and
   a plurality of light sources correspondingly disposed in the grooves.

2. The direct type backlight module according to claim 1, wherein a material of the spacer is selected from a group comprising of transparent polymethyl methacrylate (PMMA), polycarbonate (PC), modified PMMA, modified PC, and a combination thereof.

3. The direct type backlight module according to claim 2, wherein the modified PMMA is manufactured by dispersing a plurality of modified particles into a PMMA matrix material, the modified particles are selected from a group comprising of silicon dioxide and titanium dioxide particles.

4. The direct type backlight module according to claim 2, wherein the modified PC is manufactured by dispersing a plurality of modified particles into a PC matrix material, where the modified particles are selected from a group comprising of silicon dioxide and titanium dioxide particles.

5. The direct type backlight module according to claim 1, wherein a first angle is defined by the outer side surface of each wing relative to the substrate, the first angle is in the range from about 0 to about 90 degrees.

6. The direct type backlight module according to claim 1, wherein a V-shaped groove is defined by the two inner side surfaces of the wings, the V-shaped groove has a vertex angle that is in the range from about 0 to about 96 degrees.

7. The direct type backlight module according to claim 1, further comprising a plurality of sidewalls correspondingly interconnected to the substrate and the diffusion sheet, and a chamber defined between the substrate and the diffusion sheet with the sidewalls.

8. The direct type backlight module according to claim 7, further comprising one of a reflective sheet and a reflective film disposed on an inner surface of the sidewalls.

9. The direct type backlight module according to claim 7, further comprising one of a reflective sheet and a reflective film disposed on an inner surface of the substrate.

10. The direct type backlight module according to claim 1, wherein each spacer includes a top surface, the top surface is placed in contact with the diffusion sheet.

11. The direct type backlight module according to claim 10, wherein a thickness of the wing is reduced from the bottom surface to the top surface.

12. The direct type backlight module according to claim 1, wherein the light source is selected from one of a cold cathode fluorescent lamp and a light emitting diode.

13. The direct type backlight module according to claim 12, farther comprising a number of O-shaped rings mounted at the light sources.

14. The direct type backlight module according to claim 1, further comprising an optical film stacked on the diffusion sheet, wherein the optical film is selected from one of a brightness enhancement film and a diffusion film.

15. The direct type backlight module according to claim 1, further comprising a heat dissipation unit disposed under the substrate.

16. The direct type backlight module according to claim 15, wherein the heat dissipation unit has a plurality of protrusions, the substrate defines a plurality of holes, a quantity and size of protrusions correspond to the holes, and the protrusions engage with the holes of the substrate correspondingly.

* * * * *